Patented Dec. 17, 1940

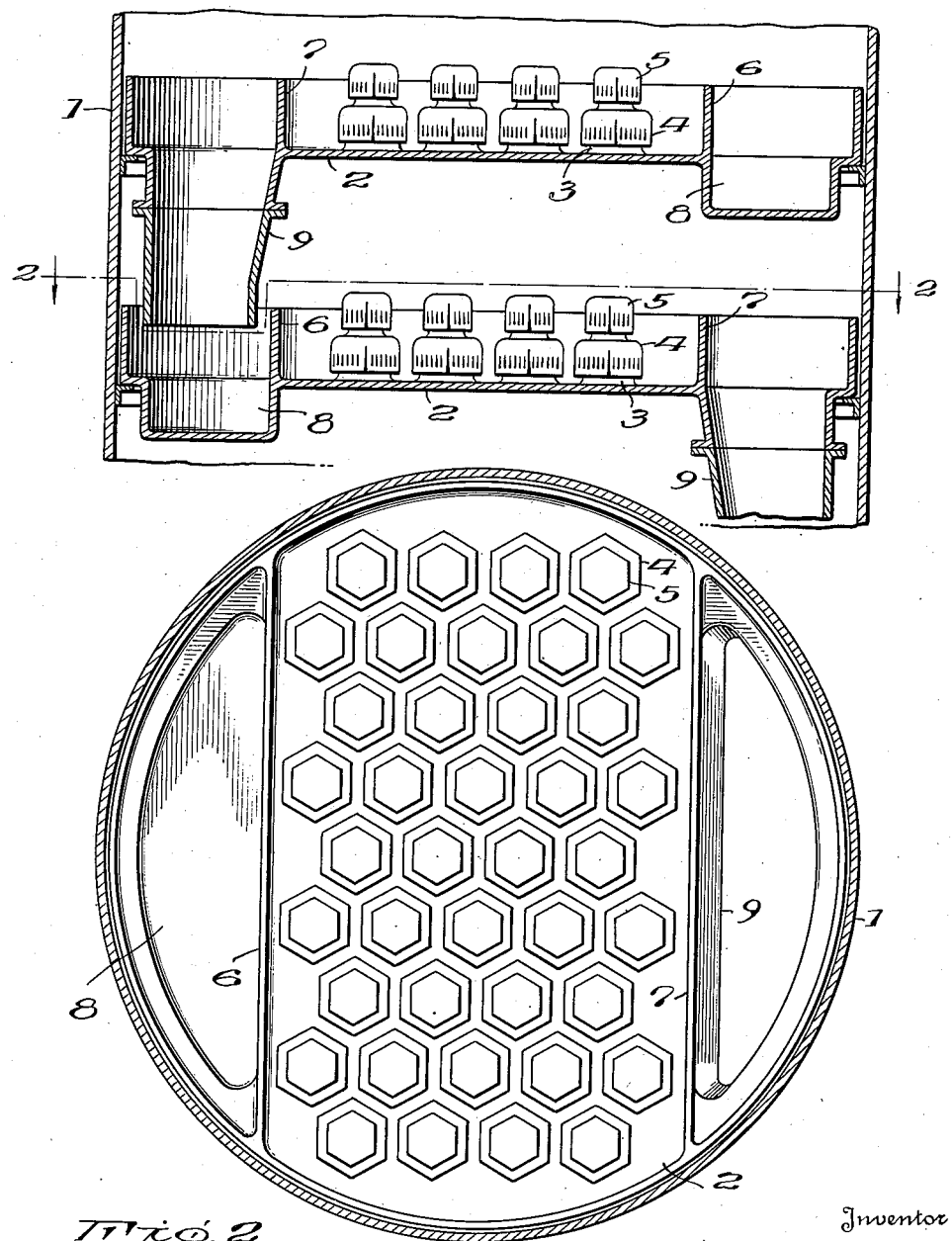

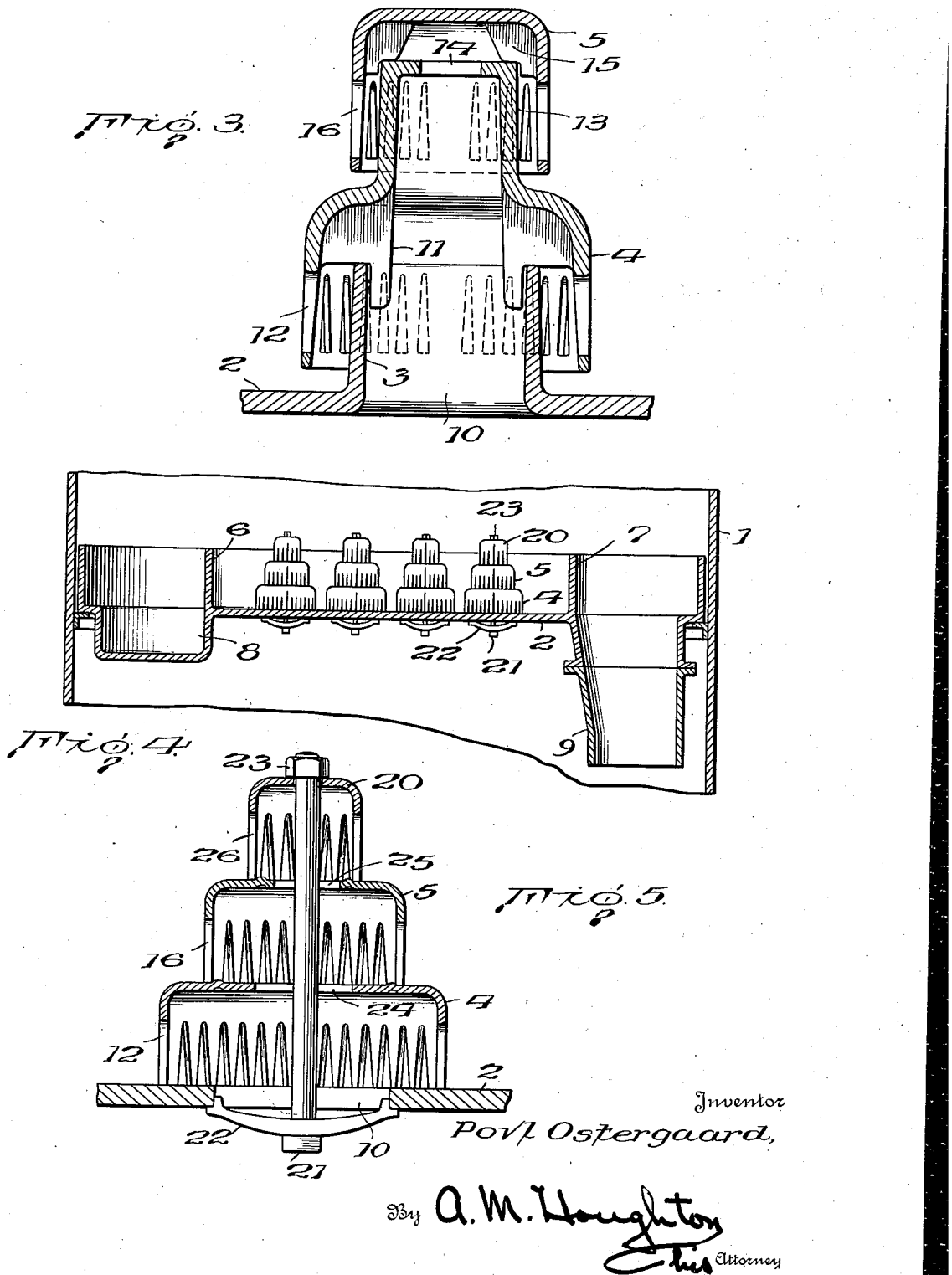

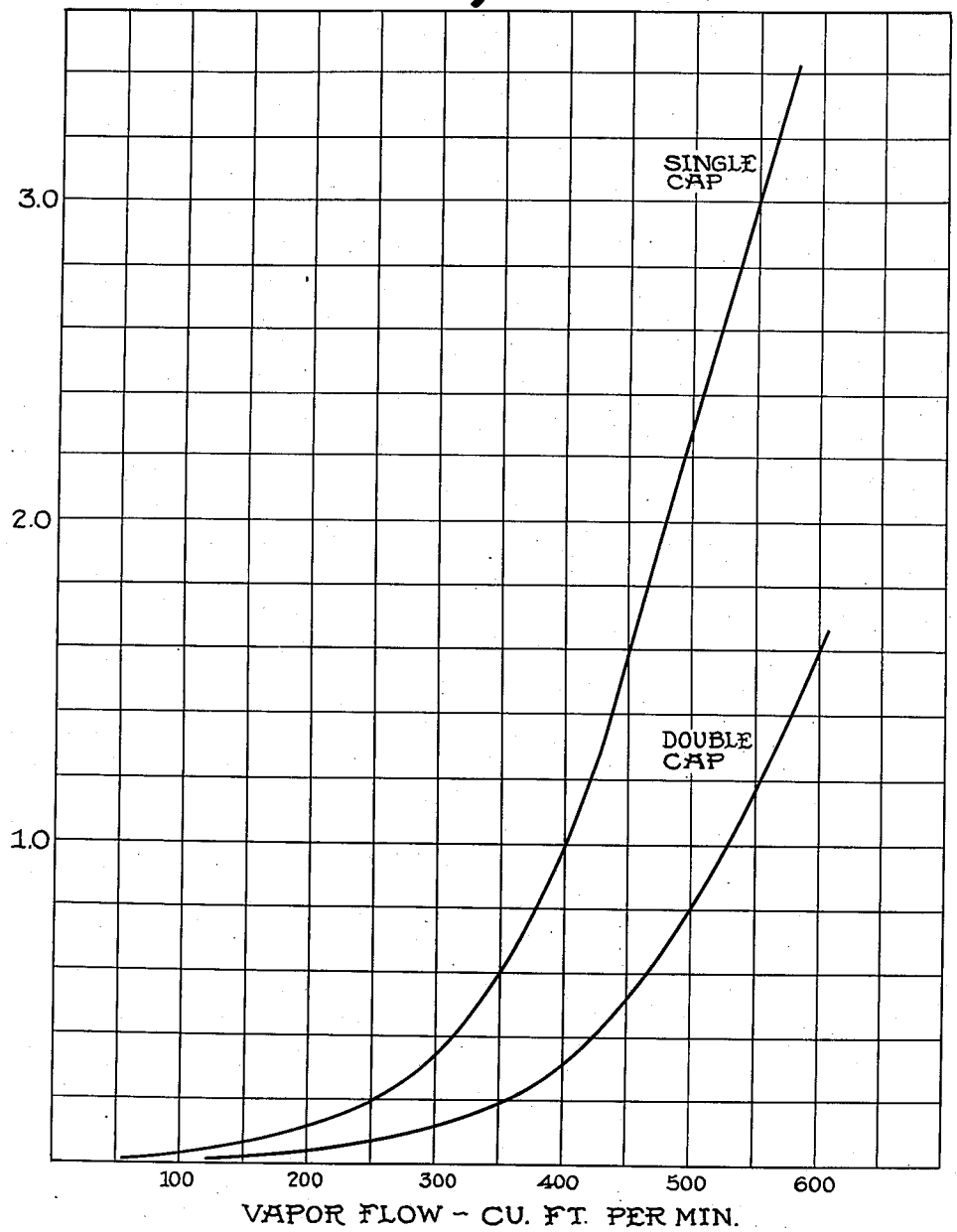

2,225,390

UNITED STATES PATENT OFFICE 2,225,390

FRACTIONATING COLUMN

Povl Ostergaard, Mount Lebanon, Pa., assignor to Gulf Oil Corporation, Pittsburgh, Pa., a corporation of Pennsylvania Application December 26, 1939, Serial No. 311,062

6 Claims. (Cl. 261—114)

This invention relates to an improvement in fractionating columns, absorption towers and the like; and it comprises, in a fractionating column or absorbing tower carrying the usual cross plates, an improved type of bubble cap carried by a plate and adapted to receive vapors from below and having a plurality of vapor exit ports located at different levels, that portion of the cap wherein are located the vapor ports on any one level being of substantially smaller diameter than that portion of the cap wherein are located the vapor ports on the next lower level; all as more fully hereinafter set forth and as claimed.

In all distilling arts where fractionating is desired, and in the art of absorbing gases or vapors in liquids, it is a common procedure to employ "bubble cap" columns or towers. A bubble cap column or tower consists essentially of a vertical cylindrical casing, a vertical series of cross plates defining chambers therebetween, and a plurality of bubble caps on each plate transmitting vapors from below. The old Dubrunfaut dephlegmator is a simple example of such columns. Certain more modern columns are improvements thereof.

The function of this column or tower, both in fractional distillation and in absorption, is to effect an intimate contact between ascending vapors and descending liquid. The manner in which this is done by a bubble cap column or tower is described post with particular reference to the fractional separation or distilling of liquids and vapors, but the principles of my invention are applicable in scrubbers and other devices involving countercurrent contact of liquids with gases or vapors.

In the fractionation of a liquid or vapor into its components, e. g. the separation of crude petroleum into naphtha, gasoline, kerosene, etc., or the separation of a vaporous crackling mixture into high boiling and low boiling fractions, the desideratum is to contact a liquid with a vapor and obtain an interchange between the two whereby the more volatile components of the liquid volatilize and pass into the vapor and the less volatile components of the vapor condense and pass into the liquid. That is, an interchange is effected between the liquid and vapor which leaves the liquid richer in components of low volatility and the vapor richer in components of high volatility than before the contact occurred.

A fractionating column serves to effect this interchange of components between a vapor and a liquid; vapor is passed upwardly through the column and liquid is passed downwardly in countercurrent relation thereto. As a result, a vapor rich in matter of high volatility can be taken out of the top of the column and a liquid rich in matter of low volatility can be taken from the bottom thereof. In other words, a "fractionation" is effected.

The fundamental unit of the bubble cap column for effecting this interchange or fractionation is the bubble tray or plate, which consists essentially of a perforated tray with slotted bubble caps fitted over the perforations, a feed pipe to convey liquid from the tray above and an outlet pipe to convey liquid to the tray below. (The feed pipe of a given tray is the outlet pipe of the tray above.) The inlet and outlet pipes are so disposed that liquid in flowing from one to the other must flow around and among the bubble caps. Vapor rising from the tray below passes through the slots in the bubble caps and up through the above-mentioned flowing liquid. Intimate contact between the liquid and vapor is attained thereby.

A type of bubble cap regarded as efficient by the art today consists of a circular, or a hexagonal or other prismatic-shaped inverted cup with slots on the skirt thereof and with an internal structure adapting it to fit over a riser extending from the underlying tray and leaving a slight space between the tray and the bottom edge of the skirt. The slots in the cap may, for example, be triangular with their apexes near the top portion of the cap and their bases near the bottom portion thereof. The slots may furthermore have serrated edges to further reduce the size of the vapor bubbles and thereby improve intimacy of contact between the vapor and liquid.

Since the bubble cap is the essential means whereby vapor is brought into intimate contact with liquid, it follows that increasing the number of bubble caps on a given tray will increase the intimacy of contact. There is, however, a limit to the number of caps that can be crowded onto a tray of given size. Among the most important factors determining the permissible extent of crowding are the following:

As bubble caps are crowded closer together on a tray the free space between them, which during operation is filled with liquid, is correspondingly reduced. Since vapor rising from the bubble caps must of necessity pass through the liquid lying between the caps its upward velocity toward the tray above is increased by reducing the space between the caps. This velocity I term the "disengaging velocity". The greater the disengaging velocity, the greater will be the amount of mist carried up by the vapor into the vapor space and the tray above. This phenomenon, that is to say, the carrying over of liquid in the form of mist from one tray to the tray above, is called "entrainment". In satisfactory operation of a bubble cap column, this entrainment should not exceed about 1 per cent. Otherwise, the fractionating efficiency of the column will be unsatisfactorily low. It is obvious from the above that crowding together of bubble caps on a tray will result in increased entrainment and hence a limit is set on this crowding.

A further consideration limiting the crowding of bubble caps on a tray is the effect thereof on the flow of liquid across the tray from the inlet pipe to the outlet pipe. For one thing, the more restricted the free space between the bubble caps, the faster must be the liquid flow therethrough for a given liquid reflux. High liquid velocities across a tray lead to splashing and mist formation, and hence entrainment. Another factor is as follows: In the normal operation of a bubble cap column a considerable body of liquid is maintained on each tray and rises to a substantial height above the tray. If the path of the flowing liquid is highly obstructed, as by crowding numerous bubble caps on the tray, a considerable resistance to the flow of liquid will be set up. This will result in a damming up of the liquid on the tray and a considerable difference in the level of the liquid from the inlet side to the outlet side of the tray; that is, near the inlet side the liquid will be at a considerably higher level than that near the outlet side. If this condition prevails, the vapor rising from the tray below will tend to pass through the bubble caps located near the outlet side because the liquid head in this area is less than in the neighborhood of the inlet pipe. Such a condition will result in inefficient contact between the vapor and liquid, and is to be avoided if possible. Especially in the case of high pressure distillation of petroleum hydrocarbons, as, for example, the operation of a high pressure cracking still, is the problem of splashing and damming up of reflux liquid on the trays a very serious factor. This is due to the fact that at high pressures, the latent heat of oil vapors is smaller than at atmospheric pressure, and consequently there is a greater amount and higher rate of flow of reflux liquid.

It is an achieved object of this invention to obviate difficulties, such as those mentioned above, which result from the crowding together of bubble caps on a bubble tray.

I have found that it is possible to reduce the disengaging velocity of vapor from liquid on a bubble tray and thereby reduce entrainment, and that it is also possible to avoid substantial gradients in the liquid level and excessive splashing of reflux liquid on a bubble tray by employing a novel type of composite bubble cap unit, which comprises a plurality of superposed, interconnected slotted bubble caps of different sizes arranged in order of decreasing size from the bottom to the top of the unit, and wherein the interconnection and slot areas are so proportioned that the resistance to vapor flow through the caps becomes progressively greater from the bottom cap to the top cap.

To better illustrate the nature of this novel type of bubble cap, drawings of specific embodiments are appended and form a part of this specification.

In the drawings,

Fig. 1 is a longitudinal sectional view of a portion of a bubble cap column employing one form of my novel bubble cap;

Fig. 2 is a horizontal sectional view through the line 2—2 of Fig. 1;

Fig. 3 is a vertical sectional view through one of the bubble caps shown in Fig. 1;

Fig. 4 is a longitudinal sectional view through a single bubble tray comprising a modified form of my invention;

Fig. 5 is a vertical sectional view through one of the bubble caps shown in Fig. 4; and Fig. 6 is a graph showing the entrainment at different gas velocities.

In the apparatus drawings similar numerals designate similar parts in the different figures.

Referring to Fig. 1, fractionating column 1 is provided with trays 2, each of which is provided with a plurality of bubble cap assemblies each comprising riser 3, a bottom slotted cap 4 and a top slotted cap 5. Tray 2 is also provided with the usual weirs 6 and 7, incoming weir section 8 and downflow pipe 9.

Referring to Fig. 2, the geometric pattern formed by the composite caps on tray 2 is shown. The larger hexagons 4 are the outlines of bottom caps 4 and the smaller hexagons 5 are the outlines of top caps 5.

Referring to Fig. 3, orifice 10 is enclosed by riser 3 extending from tray 2. Cap 4 rests on top of riser 3 by means of spacing pins 11 and does not reach quite to the level of tray 2. The sides or skirt of cap 4 contain slots 12. The top of cap 4 forms a riser 13 and orifice 14, which is smaller than orifice 10. On top of riser 13 rests cap 5 by means of spacing pins 15. The top of cap 5 is closed and the sides or skirt thereof contain slots 16.

Referring to Fig. 4, a single tray assembly in fractionating column 1 is shown. This assembly comprises tray 2 and a plurality of composite caps each of which comprises a bottom cap 4, a middle cap 5 and a top cap 20, which are held in place on tray 2 by means of bolt 21, bracket 22 and nut 23. The tray is also provided with the usual weirs 6 and 7, incoming weir section 8, and downflow pipe 9.

Referring to Fig. 5, tray 2 is provided with an orifice 10 over which bottom cap 4 is placed. Cap 4 has in its top portion orifice 24, which is smaller than orifice 10. Cap 4 is also provided with slots 12 in the sides or skirt thereof. Middle cap 5 rests on cap 4 and covers orifice 24. It contains slots 16 in its sides or skirt and orifice 25 in its top, which is smaller than orifice 24. Top cap 20 rests on cap 5 and covers orifice 25. It is provided with slots 26 in its sides or skirt. The whole assembly is held rigidly in place by means of bolt 21, bracket 22 and nut 23.

In operation, the apparatus illustrated by Figs. 1 to 3 functions as follows: Vapor ascends through orifice 10 inside riser 3 and automatically divides itself into two streams, one of which flows down between riser 3 and cap 4 and out through slots 12, while the other passes through orifice 14, down between riser 13 and cap 5 and out through slots 16. (The constricted character of orifice 14 has the following function: If orifice 14 were substantially as large as orifice 10, there would be a greater tendency for vapor to pass exclusively through orifice 14 and slots 16 because the liquid head above slots 16 is substantially less than that above slots 12. However, the constriction of orifice 14 causes it to act as a pressure reducing valve, thereby overcoming this tendency and forcing vapor to pass through slots 12 and 16 in the desired ratio. The particular ratio will depend upon the size of orifice 14 and the ratio of slots 16 to slots 12.) Reflux liquid enters through pipe 9 from the tray above, overflows weir 6 and flows through the space between the bubble caps (i. e. the space between the outer hexagons of Fig. 2). It then overflows weir 7 and flows through a second pipe 9 to the tray below. That the available space for liquid flow and for disengaging vapor from liquid is greatly increased is apparent from Figs. 1 and 2. With caps of conventional design (i. e. single caps) only the space between such caps would be available. To this is added by my invention the large amount of space above the lowest cap and up to nearly the top of the highest cap.

The bubble cap and tray shown in Figs. 4 and 5 function similarly, but an even greater amount of free space is available.

The design of my novel type of cap may be varied from the designs shown in the drawings. Thus other shapes than hexagonal may be employed, and the proportioning of the slots and interconnecting orifices may be varied. I find it convenient, however, in the case of a double cap, so to regulate the size of the orifice connecting the top and bottom caps that the drop in pressure through this orifice is equal to the pressure exerted by a column of liquid lying between the top of the lower slots and the top of the upper slots. Referring specifically to Fig. 3, let $P_1$ be the drop in pressure caused by orifice 14 and let $P_2$ be the pressure exerted by the liquid between the top of slots 12 and the top of slots 16. Then orifice 14 is made of such size that $P_1=P_2$. Under such conditions, the proportion of total vapor which will pass through slots 16 will be equal to the ratio of the number of slots 16 to the total number of slots 12 plus 16. Thus if it is desired to pass one third of the vapor through slots 16, then there should be half as many slots in the upper cap as in the lower cap. In the case of a triple cap, the calculations are essentially similar. With reference to Fig. 5, let $P_1$ and $P_2$ be the pressure drops through orifices 24 and 25, respectively, and let $P_3$ and $P_4$ be the pressures exerted by the liquid between the tops of slots 12 and 16, and slots 16 and 26, respectively. It is convenient to so proportion orifices 24 and 25 that $P_1=P_3$ and $P_2=P_4$. Under such circumstances, the proportion of the total vapor passing through the slots in any cap will be equal to the ratio of the number of slots in that cap to the total number of slots.

Among the advantages of bubble cap designs such as those shown in the drawings are the following: The free space between the caps can be increased by as much as 105 per cent in the case of double caps and 153 per cent in the case of triple caps over conventional bubble trays. Consequently capacity can be increased by as much as 66.7 per cent and 111 per cent, respectively. Conversely, the number of caps on a plate of given size can be considerably increased, which results in more efficient contact between liquid and vapor.

By increasing the free space between the caps on a tray, the liquid gradient across the tray can be reduced to one-quarter, or even less, of the corresponding gradient across a conventional tray. Furthermore, the increase of free space greatly reduces the liquid velocity across the trays and hence the amount of splashing and entrainment.

Reference to the curves of Fig. 6 will illustrate the effect of double caps on entrainment. In this figure, abscissae represent vapor flow in cubic feet per minute and ordinates represent per cent entrainment. The rate of flow of reflux was 20 gallons per minute. Trays 18 inches in diameter each containing 13 bubble caps were used. It is evident that a very marked improvement was obtained with the double caps. At 1 per cent entrainment, about 33 per cent higher vapor flow (and hence capacity) could be employed.

The bubble caps of this invention are particularly advantageous in pressure stills for cracking petroleum hydrocarbons. These stills operate at 50 to 500 pounds pressure and at high temperatures. Due to such drastic conditions they must be built very stoutly and hence are expensive to construct. For example, a 12 foot tower operating at 400 pounds pressure often requires a shell thickness of 3½ inches. With the new type of double cap, more caps can be placed on each tray with the result that a 10 foot tower with the shell thickness of only 2⅛ inches will serve the same purpose as the larger tower using conventional caps. The resulting saving in cost of construction is about 40 per cent. Alternatively, the capacity of a given cracking still can be greatly increased, e. g. from 25,000 barrels a day to 40,000 barrels a day.

The caps of this invention are particularly adapted to the problem of varying the capacity of a fractionating column along its length. It is well known that the vapor load is greatest in the top section of a fractionating column and decreases toward the bottom. Sometimes this factor is taken care of by varying the diameter of the column so as to enable the use of more caps per tray at the top than at the bottom. This is made unnecessary by my improved type of bubble cap, since a column of uniform diameter can readily be provided with my composite caps at the top and ordinary caps at the bottom. It may even be advantageous to install triple caps in the top, double caps in the middle, and single caps in the bottom section of the column.

An important limitation of the use of my bubble cap results from the necessity of maintaining a substantial height of liquid on the tray. The liquid level should not fall below the top of the topmost slots, for if it does, the vapor will tend to flow entirely through the top cap. In ordinary pressure, and even atmospheric distillation working near full capacity, this limitation is of no consequence; even operation down to 15 per cent of capacity with double caps and 25 per cent with triple caps is possible. But in vacuum distillation, due to the necessity of maintaining very little liquid on the trays, I do not recommend the use of the caps of this invention.

What I claim is:

1. A bubble tray assembly which comprises a tray provided with vapor uptake ports at least some of which are surmounted by bubble caps in each of which there are two or more series of lateral vapor passages located at different levels and an internal vapor passage from bottom to top of the cap and in each of which the diameter of the cap at any one higher level of lateral vapor passages is substantially smaller than the diameter at the next lower level of such passages, a downflow conduit, and means for maintaining a liquid level on said tray above the topmost of said lateral vapor passages, said lateral and internal vapor passages being so constructed that the effective back-pressures of liquid on the tray through said lateral vapor passages are substantially equalized.

2. A bubble tray assembly which comprises a tray provided with vapor uptake ports at least some of which are surmounted by bubble cap units in each of which a plurality of superposed bubble caps of substantially different sizes provided with lateral vapor passages are arranged in diminishing sizes from bottom to top and are connected by an internal vapor passage from the bottom cap to the top cap, a downflow conduit, and means for maintaining a liquid level on said tray above the topmost of said lateral vapor passages, said lateral and internal vapor passages being so constructed that the effective back-pressures of liquid on the tray through said lateral vapor passages are substantially equalized.

3. A bubble tray assembly which comprises a tray provided with vapor uptake ports at least some of which are surmounted by bubble cap units each having a bottom cap containing lateral vapor passages and containing an orifice in its top portion and having a substantially smaller top cap fitted over said orifice and containing lateral vapor passages, a downflow conduit, and means for maintaining a liquid level on said tray above the topmost of said lateral vapor passages, said orifice and said lateral vapor passages being so constructed that the effective back-pressures of liquid on the tray through said lateral vapor passages are substantially equalized.

4. A bubble tray assembly which comprises a tray provided with vapor uptake ports at least some of which are surmounted by bubble cap units in each of which three superposed bubble caps of substantially different sizes provided with lateral vapor passages are arranged in diminishing sizes from bottom to top and are connected by an internal vapor passage from the bottom cap to the top cap, a downflow conduit, and means for maintaining a liquid level on said tray above the topmost of said lateral vapor passages, said lateral and internal vapor passages being so constructed that the effective back-pressures of liquid on the tray through said lateral vapor passages are substantially equalized.

5. A bubble tray assembly which comprises a tray provided with vapor uptake ports at least some of which are surmounted by bubble cap units each having a bottom cap containing lateral slots and containing an orifice in its top portion and having a substantially smaller top cap fitted over said orifice and containing lateral slots, a downflow conduit, and a weir separating said downflow conduit from said bubble cap units which is of sufficient height to maintain a liquid level on said tray above the topmost of said lateral slots, said orifice and said lateral slots being so constructed that the effective back-pressures of liquid on the tray through said lateral slots are substantially equalized.

6. A bubble tray assembly comprising a tray provided with vapor uptake ports at least some of which are surmounted by bubble cap units in each of which three superposed bubble caps of substantially different sizes provided with lateral slots are arranged in diminishing sizes from bottom to top and are connected by an internal vapor passage from the bottom cap to the top cap, a downflow conduit, and a weir separating said downflow conduit from said bubble cap units which is of sufficient height to maintain a liquid level on said tray above the topmost of said lateral slots, said lateral slots and said internal vapor passages being so constructed that the effective back-pressures of liquid on the tray through said lateral slots are substantially equalized.

POVL OSTERGAARD.